Feb. 14, 1950 E. H. LANHAM 2,497,779
FOUR-WIRE TRANSMISSION CIRCUIT THERMISTOR CONTROL
Filed Oct. 9, 1946
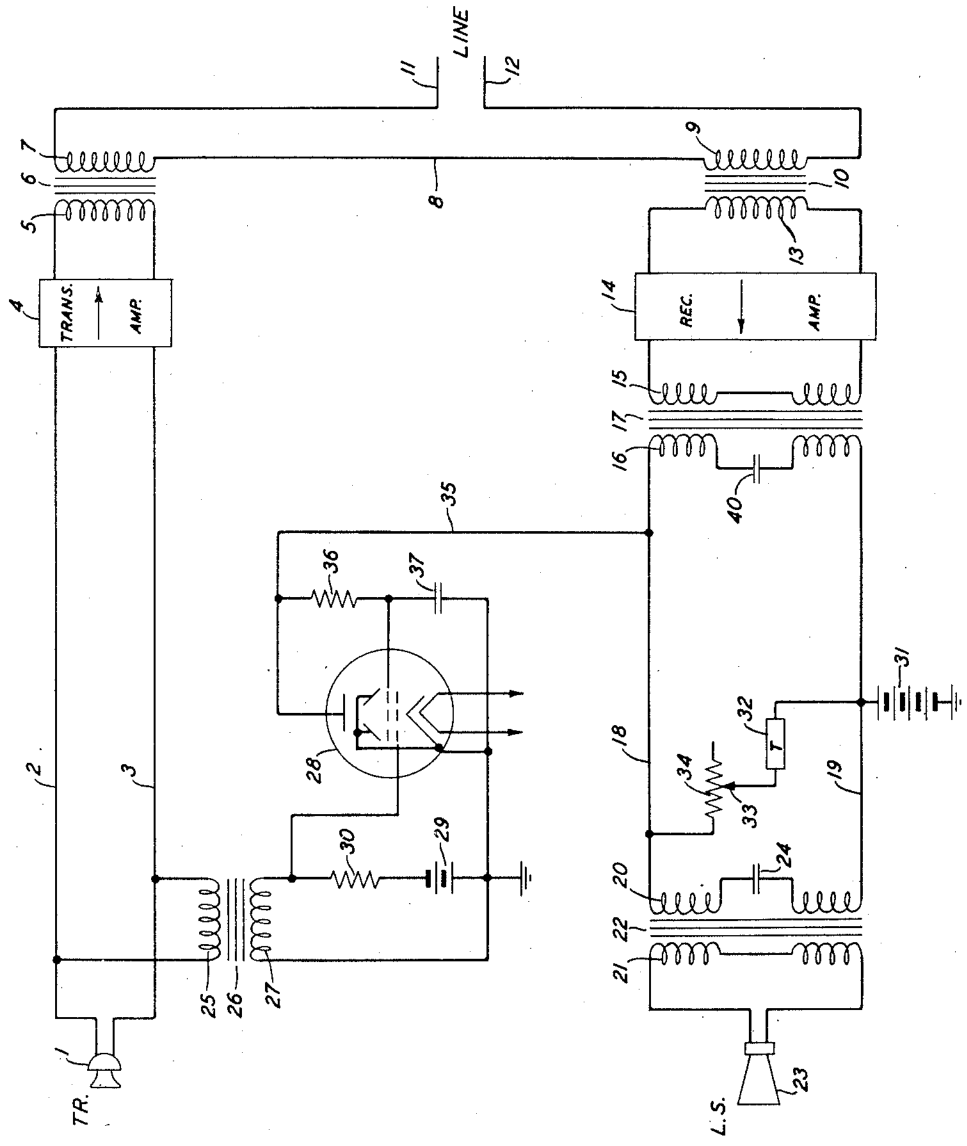
INVENTOR
E. H. LANHAM
BY John E. Cassidy
ATTORNEY Patented Feb. 14, 1950 2,497,779

UNITED STATES PATENT OFFICE 2,497,779

FOUR-WIRE TRANSMISSION CIRCUIT THERMISTOR CONTROL

Edward H. Lanham, Montreal, Quebec, Canada, assignor, by mesne assignments, to Northern Electric Company, Limited, Montreal, Quebec, Canada, a corporation of Canada Application October 9, 1946, Serial No. 702,110

5 Claims. (Cl. 179—1)

This invention relates to four-wire transmission systems and more particularly to arrangements for controlling transmission in signaling transmission systems and preventing singing in transmission systems in which separate two-wire paths are provided for transmission in opposite directions.

The principal object of my invention is improved operation in singing prevention circuits by means of inexpensive apparatus.

Arrangements for preventing singing in four-wire circuits are numerous and well known in the art. Echo suppressors for instance, of which there are many include the singing prevention function. There are at least two basically different types of echo suppressors and singing prevention circuits, namely voice operated magnetic relays which actuate relay contacts to open and close one of the two-wire paths in response to transmission in the other and variable impedance shunting elements in which the impedance of an element shunting one two-wire branch is varied in response to transmission in the other.

Among these different types of circuits are circuits of considerable elaboration which are entirely effective but relatively expensive and others which are simple and inexpensive but which are not entirely satisfactory. As is generally understood in the art many elaborate voice operated relay switching arrangements, while satisfactory in certain applications, such as in long toll lines and in long distance radio telephone circuits in which the initial cost of expensive relay switching circuits and large annual maintenance charges can be justified, are unsuitable in other applications where expense is an important factor. For instance in a so-called local loud-speaker telephone installation, such as may be employed in interconnecting two offices in the same building and which is subject to singing, the high cost of elaborate circuits would be prohibitive. Attempts have been made to devise inexpensive anti-singing circuits but so far as applicant is aware none of these has been entirely satisfactory. For instance, it has been found that certain variable impedance shunting arrangements which appeared promising in that they eliminated magnetic relays, which are relatively expensive and which require frequent visits of maintenance men to keep them in adjustment, do not satisfactorily eliminate singing.

A really effective shunt across one two-wire path, the impedance of which shunt can be controlled in response to transmission in the other two-wire path, appears well suited for employment as an anti-singing device in four-wire loudspeaking telephone circuits. Such an arrangement would not require visits of a telephone maintenance man to the customers premises as would an arrangement employing magnetic relays, the contacts of which require periodic adjustment. A number of relatively inexpensive shunting arrangements have heretofore been proposed but each has been subject to some difficulty which prevented its satisfactory utilization. For instance, in one arrangement a coil wound on a permalloy core has been employed as the shunting element for one two-wire path. The magnetization of the core and the impedance of the shunting coil have been controlled in response to transmission in the opposite branch. It has been found, however, that while the control branch is transmitting, during which interval the impedance of the shunting coil should remain at a low fixed value, the impedance is not constant, but varies considerably and the variation gives rise to singing in the system. The present invention corrects this difficulty by providing a shunt which remains at a constant low value while the opposite two-wire path is transmitting.

The invention may be understood from the following description when read with reference to the associated drawing, showing a preferred embodiment of the invention, as well as from reference to the claims herein.

Refer now to the drawing which shows a transmitter 1, which may for instance be a well-known microphone transmitter, connected to conductors 2 and 3 of a first or transmitting two-wire path which extends through transmitting amplifier 4 to the primary winding 5 of transmitting transformer 6. The secondary winding 7 of the transmitting transformer is interconnected through conductor 8 and the primary winding 9 of receiving transformer 10, to the two line conductors 11 and 12. The secondary 13 of receiving transformer 10 is connected through receiving amplifier 14, and the primary and secondary windings 15 and 16 of transformer 17, conductors 18 and 19 of the second, or receiving, two-wire path, and through primary and secondary windings 20 and 21 of transformer 22 to the loudspeaker receiver 23. The inner terminals of the split windings 16 and 20 are each interconnected through condensers 24 and 40.

Bridged across the transmitting conductors 2, 3 is the primary winding 25 of transformer 26. The right-hand terminal of secondary winding 27 of transformer 26 is connected to the control element or grid and the left-hand terminal of winding 27 is connected to the grounded cathode of tube 28. Vacuum tube 28 should have a relatively high output and to this end may for instance be a beam power tube such as the R. C. A. 6L6 tube. The grid is biased with respect to the cathode by battery 29, the positive terminal of which is connected to the grounded cathode and the negative terminal of which is connected through resistance 30 to the control grid. The output circuit of tube 28 may be traced from grounded positive battery 31 through thermistor 32, sliding contact 33 and variable resistance 34, conductor 18 and conductor 35 to the anode of tube 28. Bridged between the anode and cathode of tube 28 is a circuit consisting of resistance 36 and condenser 37. The screen grid of tube 28 is connected to the junction between resistance 36 and condenser 37. The cathode of tube 28 is indirectly heated by a filament which may be connected to a source of battery not shown. The tube is equipped with secondary beam directing cathode plates which tend to direct and to concentrate the electron stream and to prevent secondary emission. The outer terminals of the variable impedance thermistor element 32 and its associated variable resistance 34 are connected between conductors 18 and 19.

The operation of the circuit is as follows. When signals are impressed on the transmitter 1, the corresponding variations in voltage are impressed through amplifier 4 and transformer 6 through conductor 8 and the secondary 9 of transformer 10 on conductors 11 and 12 which extend to the connected station. The variations in voltage are simultaneously impressed through transformer 26 on the input circuit of tube 28. Normally tube 28 is biased to cut-off by negative battery 29, so that no current flows through thermistor 32. The characteristics of thermistor 32 are such that when no current flows through it its impedance is a maximum. When the impedance of thermistor 32 is a maximum the shunt is ineffective and the receiving branch is therefore in a condition to receive signals incoming over conductors 11, 12 through the two-wire receiving branch 18—19. The input circuit of tube 28 is so adjusted that its bias is overcome by each positive half cycle of the voltage wave in conductors 2, 3. This results, because of the characteristics of the selected type of tube, in a relatively heavy current flowing in the output circuit through thermistor 32 during each positive half cycle. The tube is so chosen that the magnitude of its output current is sufficiently large that the impedance of thermistor 32 is lowered in its minimum value and remains at its minimum value as long as transmission continues in the transmitting branch. During this interval the input to the loudspeaker is effectively short-circuited. The characteristics of the thermistor selected should be such that for the output current of the tube there is sufficient lag in its response so that its impedance remains at a low value during the intervals between successive positive half cycles. The output of the tube is preferably relatively high to promote this effect by delaying the cooling of the thermistors between successive positive half cycles.

Incorporated herein by reference are the following patents disclosing thermally sensitive resistors or "thermistors" as they are called and the design of a "thermistor" having the required characteristics may be in accordance with the disclosures therein: G. L. Pearson 2,184,187, December 26, 1939; G. L. Pearson et al. 2,253,577, August 26, 1941; G. L. Pearson 2,280,257, April 21, 1942; and G. L. Pearson 2,276,864, March 17, 1942.

It has been found that through a proper choice of tube and thermistor, it is a relatively simple matter to maintain a shunt of sufficiently low impedance so as to effectively block input into the receiver 23 throughout the interval during which transmission continues in the transmitting branch. The variable resistance 34 provides an adjustment in the shunt branch to care for variations in the elements and in local conditions.

By means of the above described arrangement it is possible to eliminate the manually operable singing prevention switching device which is ordinarily employed to alternately enable and disable the transmitting and receiving two-wire branches for opposite directions of transmission during a conversation over the circuit. Such a switching device has obvious disadvantages, chief among which are caused by occasional failure to manipulate the switch with resultant failure to transmit. The switching herein is effected automatically by means of a few inexpensive elements which effectively prevent singing.

What is claimed is:

1. A four-wire transmission circuit having a first and a second two-wire transmitting path, a control branch interconnecting said paths, said control branch having a thermistor connected in shunt across said first path, a vacuum tube in said branch, an input circuit of said tube connected to said second path, an output circuit for said tube including said thermistor, and means for varying the current through said thermistor in response to transmission in said second path to vary the impedance of said shunt to reduce the effect of acoustic coupling between said paths.

2. A four-wire loudspeaker telephone transmission system having a first and a second two-wire transmission path, a control branch interconnecting said paths, said branch having a thermistor connected in a shunt across said first path, a vacuum tube in said branch, an input circuit for said tube connected to said second path, an output circuit for said tube including said thermistor and means responsive to the positive half cycles of transmission voltages in said second path for generating a current of relatively large magnitude in said output circuit and conducting said current through said thermistor to maintain the impedance of said shunt at a minimum during both positive and negative half cycles of transmission voltages while transmission continues in said second path.

3. In an electrical communication circuit, a first path in which controlling voltages are generated, a second path to be controlled by said voltages, a bridge connecting said paths, a vacuum tube in said bridge, a thermistor in said bridge, the input of said tube connected to said first path, the output of said tube connected to said thermistor, said thermistor connected to said second path, a biasing circuit for said tube, said tube biased so as to be responsive only to positive half cycles of said voltage, said tube having an output current of sufficient magnitude to maintain said thermistor at low impedance during the intervals between said positive half cycles of said voltage.

4. In a four-wire loudspeaking telephone system, a transmitting branch comprising a transmitter connected to a two-wire transmitting branch, a loudspeaker receiver connected to a two-wire receiving branch, said branches coupled through individual transformers to a single two-way, two-wire line, a thermistor shunted across said two-wire receiving branch, a transmission control path interconnecting said transmitting branch and said receiving branch, said control path including a vacuum tube having an input circuit connecting to said transmitting branch and an output circuit extending through said thermistor, said tube biased so that it is normally cut off and is responsive to positive half cycles of voltage due to voice current in said transmitting branch, said tube having an output current of relatively large magnitude, so as to heat said thermistor sufficiently in response to said positive half cycles so as to maintain the impedance of said thermistor at a relatively low valve between said positive half cycles, so as to prevent transmission in said receiving branch when transmission is proceeding through said transmission branch.

5. In a four-wire loudspeaker telephone system, individual one-way, two-wire transmitting and receiving branches coupled to a single two-way two-wire circuit, a telephone transmitter and a loudspeaker telephone receiver connected individually to said transmitting and receiving branches respectively, a thermistor shunting said receiving branch, a control path interconnecting said transmitting and receiving branches, said control path having a vacuum tube of the beam power type, said tube having an input connected to said transmitting branch and an output path extending in series through said thermistor, said tube having a biasing circuit and normally biased to cut off, said tube responsive to positive half cycles of voltage due to voice currents in said transmitting branch, said tube having an output current of sufficient magnitude to maintain said thermistor at a sufficiently low impedance to prevent transmission in said receiving branch while said transmitting branch is in the transmitting condition.

EDWARD H. LANHAM.

REFERENCES CITED

The following references are of record in the file of this patent:

UNITED STATES PATENTS

| Number | Name | Date |
|---|---|---|
| 1,491,340 | Curtis | Apr. 22, 1924 |
| 2,205,142 | Hoard | June 18, 1940 |
| 2,282,405 | Herrick | May 12, 1942 |
| 2,287,998 | Johnson | June 30, 1942 |
| 2,360,940 | Edwards | Oct. 24, 1944 |
| 2,279,768 | Van Wynen | July 3, 1945 |